US012474051B2

(12) United States Patent
Oh et al.

(10) Patent No.: US 12,474,051 B2
(45) Date of Patent: Nov. 18, 2025

(54) JET NOZZLE, COMBUSTOR, AND GAS TURBINE INCLUDING SAME

(71) Applicant: DOOSAN ENERBILITY CO., LTD., Changwon-si (KR)

(72) Inventors: Kyoung Taek Oh, Hwaseong (KR); Sang Pil Jo, Sejong (KR); Young Gun Go, Yongin (KR)

(73) Assignee: DOOSAN ENERBILITY CO., LTD., Changwon-si (KR)

( * ) Notice: Subject to any disclaimer, the term of this patent is extended or adjusted under 35 U.S.C. 154(b) by 114 days.

(21) Appl. No.: 18/334,613

(22) Filed: Jun. 14, 2023

(65) Prior Publication Data

US 2024/0003544 A1 Jan. 4, 2024

(30) Foreign Application Priority Data

Jun. 30, 2022 (KR) ........................ 10-2022-0080427

(51) Int. Cl.
*F23R 3/00* (2006.01)

(52) U.S. Cl.
CPC .......... *F23R 3/002* (2013.01); *F05D 2240/35* (2013.01)

(58) Field of Classification Search
CPC .. F23R 3/002; F23R 3/045; F23R 3/06; F23R 3/08
See application file for complete search history.

(56) References Cited

U.S. PATENT DOCUMENTS

2016/0201908 A1* 7/2016 Drake ........................ F02C 7/18 415/115
2020/0041127 A1* 2/2020 Vukanti .................. F23R 3/002
2022/0333776 A1* 10/2022 Rybak-Tucholska ... F23R 3/346
2022/0364729 A1* 11/2022 Singh ........................ F23R 3/16

FOREIGN PATENT DOCUMENTS

JP 2017-172953 A 9/2017
KR 10-2138013 B1 7/2020
KR 10-2138016 B1 7/2020

* cited by examiner

*Primary Examiner* — Andrew H Nguyen
(74) *Attorney, Agent, or Firm* — Harvest IP Law, LLP

(57) ABSTRACT

Proposed are a jet nozzle, and a combustor and a gas turbine including the jet nozzle. The jet nozzle is formed on an inner surface of a combustor to supply fluid into an interior of a liner of the combustor in a direction intersecting with a progress direction of combustion gases primarily combusted in a combustion chamber in the interior of the liner. The jet nozzle includes a body section provided with a fluid inlet on a first end, through which fluid is introduced, and a fluid outlet on a second end, through which the fluid introduced through the fluid inlet is discharged while generating a vortex, and a baffle section formed on an inner peripheral surface of the second end of the body section and configured to enhance the generation of a counter-rotary shear layer vortex in the fluid discharged out of the fluid outlet through the body section.

15 Claims, 8 Drawing Sheets

1500
1510
1512
1522
1520
1521
1510
1511

JET NOZZLE, COMBUSTOR, AND GAS TURBINE INCLUDING SAME

CROSS REFERENCE TO RELATED APPLICATION

The present application claims priority to Korean Patent Application No. 10-2022-0080427, filed on Jun. 30, 2022, the entire contents of which are incorporated herein for all purposes by this reference.

BACKGROUND OF THE INVENTION

1. Field of the Invention

The present disclosure relates to a jet nozzle, a combustor, and a gas turbine including the same. More particularly, the present disclosures relates to a jet nozzle formed on an inner surface of a combustor to supply a fluid utilized for secondary combustion in a combustion chamber inside a liner of the combustor.

2. Description of the Background Art

A turbomachine refers to an apparatus that generates power for power generation through a fluid (particularly, gas) passing through the turbomachine. Therefore, the turbomachine is usually installed and used together with a generator. Such a turbomachine may include a gas turbine, a steam turbine, a wind power turbine, and the like. The gas turbine is an apparatus that mixes compressed air and natural gas and combusts an air-fuel mixture to generate combustion, which in turn generates power for power generation. The steam turbine is an apparatus that heats water to generate steam, which in turn generates power for power generation. The wind turbine is an apparatus that converts wind power into power for power generation.

Among the turbomachines, the gas turbine includes a compressor, a combustor, and a turbine. The compressor has a plurality of compressor vanes and compressor blades alternately arranged within a compressor casing. In addition, the compressor sucks external air through a compressor inlet scroll strut. The sucked air is compressed by the compressor vanes and the compressor blades while passing through an interior of the compressor. The combustor receives the compressed air from the compressor and mixes the compressed air with fuel to form a fuel-air mixture.

In addition, the combustor ignites the fuel-air mixture with an igniter to generate high-temperature and high-pressure combustion gas. The generated combustion gas is supplied to the turbine. In the turbine, a plurality of turbine vanes and turbine blades are arranged in a turbine casing. The combustion gas generated by the combustor passes through the turbine. While passing through an interior of the turbine, the combustion gas rotates the turbine blades and then is discharged to the outside through a turbine diffuser.

Among the turbomachines, the steam turbine includes an evaporator and a turbine. The evaporator heats water supplied from the outside to generate steam. In the turbine, a plurality of turbine vanes and turbine blades are alternately disposed in a turbine casing, similarly to the turbine in a gas turbine. However, in the turbine in the steam turbine, the steam generated in the evaporator, instead of the combustion gas, passes through the turbine to rotate the turbine blades.

In the combustor, when a fluid for proceeding with the secondary combustion is injected into the interior of the liner using the combustion gases that are produced during the primary combustion of the air-fuel mixture and then moved to the turbine section so as to mix with the combustion gases, it is required to increase the mixing rate of the combustion gases and the fluid, and research is being conducted on this.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a jet nozzle, which can increase the mixing rate of combustion gases moved to a turbine section after being first combusted in a combustion chamber formed inside a liner of a combustor and a fluid for secondary combustion of the combustion gases thereby improving a nozzle structure for the fluid, a combustor, and a gas turbine including the former components.

According to an aspect of the present disclosure, there is provided a jet nozzle formed on an inner surface of a combustor to supply fluid into an interior of a liner of the combustor in a direction intersecting with a progress direction of combustion gases primarily combusted in a combustion chamber in the interior of the liner, the jet nozzle including: a body section provided with a fluid inlet on a first end, through which fluid is introduced, and a fluid outlet on a second end, through which fluid introduced through the fluid inlet is discharged while generating a vortex; and a baffle section formed on an inner peripheral surface of the second end of the body section and configured to enhance the generation of a counter-rotary shear layer vortex in the fluid discharged out of the fluid outlet through the body section.

In the jet nozzle, the fluid outlet of the body section may be connected to a communication port formed on a peripheral surface of the liner, the body section may have a hollow cylindrical shape whose diameter decreases from the first end to the second end, and the baffle section may be installed to opposingly protrude into a center portion of the body section from two opposing peripheral portions of the second end of the body section.

The baffle section may include a first integral baffle part provided at a first side on the second end of the body section, and a second integral baffle part provided at a second side on the second end of the body section, the first side and the second side being opposing each other, wherein the first integral baffle part and the second integral baffle part are opposingly provided to respectively have an arch angle within 900 to 1100 on two opposing surfaces of the second end of the body section.

The baffle section may include a first toothed baffle part provided at a first side on the second end of the body section, and a second toothed baffle part provided at a second side on the second end of the body section, wherein the first toothed baffle part and the second toothed baffle part are opposingly provided to respectively have an arch angle within 900 to 1100 on two opposing peripheral surfaces of the second end of the body section, and the first toothed baffle part and the second toothed baffle part respectively include a plurality of first baffle teeth spaced apart from each other and a plurality of second baffle teeth spaced apart from each other.

According to another aspect of the present disclosure, there is provided a combustor provided to mix compressed air supplied from a compressor of a gas turbine and fuel supplied from a fuel injector to form a compressed air-fuel mixture, to combust the mixture to produce combustion gases, and to supply the combustion gases to a turbine section of the gas turbine, the combustor including: a nozzle casing; a liner connected to a turbine section-side end of the nozzle casing and having a combustion chamber in which the compressed air-fuel mixture is combusted; a transition piece connected to a turbine section-side end of the liner to supply combustion gas generated in the combustion chamber to the turbine section; a nozzle assembly disposed in the nozzle casing to inject fuel and compressed air into the combustion chamber; and a jet nozzle configured to supply fluid into an interior of a liner in a direction intersecting with a progress direction of combustion gases primarily combusted in the combustion chamber in the interior of the liner, the jet nozzle including: a body section provided with a fluid inlet on a first end, through which fluid is introduced, and a fluid outlet on a second end, through which the fluid introduced through the fluid inlet is discharged while generating a vortex; and a baffle section formed on an inner peripheral surface of the second end of the body section and configured to enhance the generation of a counter-rotary shear layer vortex in the fluid discharged out of the fluid outlet through the body section.

According to a further aspect of the present disclosure, there is provided a gas turbine including: a compressor provided to compress air introduced from the outside; a combustor provided to mix the compressed air supplied from the compressor with fuel supplied from a fuel injector and combust the air-fuel mixture; and a turbine section provided to generate power for generating electricity while the combustion gases supplied from the combustor flow therethrough, the combustor including: a nozzle casing; a liner connected to a turbine section-side end of the nozzle casing and having a combustion chamber in which the compressed air-fuel mixture is combusted; a transition piece connected to a turbine section-side end of the liner to supply the combustion gases generated in the combustion chamber to the turbine section; a nozzle assembly disposed in the nozzle casing to inject fuel and compressed air into the combustion chamber; and a jet nozzle configured to supply fluid into an interior of the liner in a direction intersecting with a progress direction of the combustion gases primarily combusted in the combustion chamber in the interior of the liner, the jet nozzle including: a body section provided with a fluid inlet on a first end, through which fluid is introduced, and a fluid outlet on a second end, through which the fluid introduced through the fluid inlet is discharged while generating a vortex; and a baffle section formed on an inner peripheral surface of the second end of the body section and configured to enhance the generation of a counter-rotary shear layer vortex in the fluid discharged out of the fluid outlet through the body section.

According to the jet nozzle, combustor, and gas turbine of the present disclosure, fluid is supplied into the interior of a liner of the combustor through a communication port formed on the peripheral surface of the liner in a direction intersecting with a progress direction of combustion gases that is moved to the turbine section in the interior of the liner after being primarily combusted so that second combustion can be carried out in the interior of the liner, thereby increasing combustion efficiency, and the fluid is supplied into the interior of the liner while generating a shear layer vortex in the counter-rotary direction by a baffle section, thereby increasing the mixing rate of combustion gases and fuel.

DETAILED DESCRIPTION OF THE INVENTION

Figure 1:
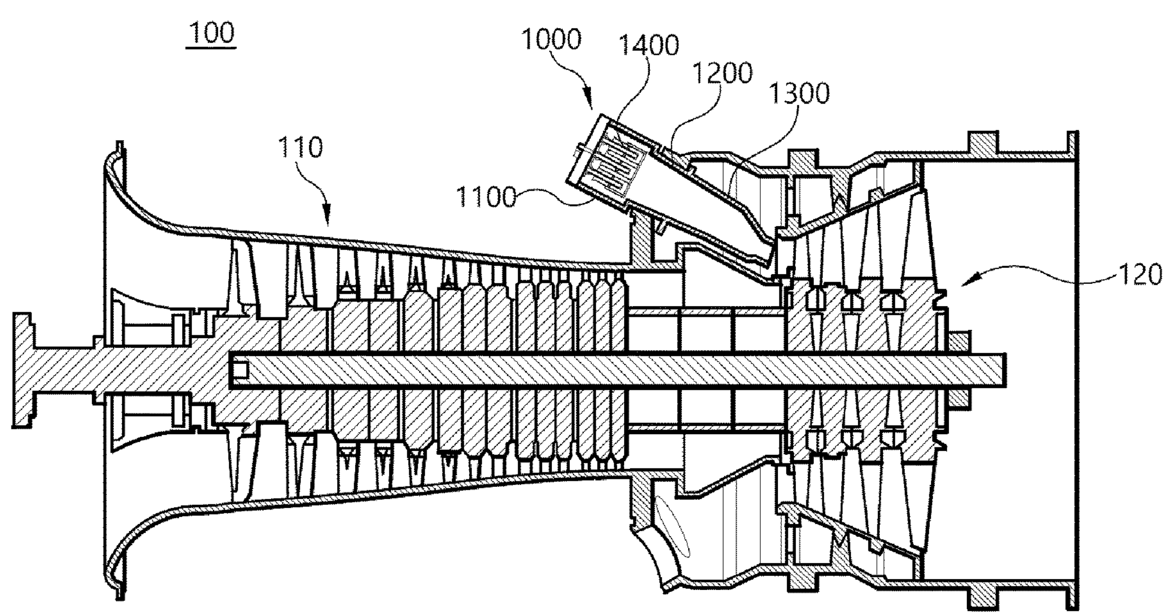
FIG. 1 is a cross-sectional view illustrating a gas turbine according to the present disclosure.

Hereinafter, preferred embodiments according to the present disclosure will be described in detail with reference to the accompanying drawings. Prior to describing the present disclosure, the terms or words used herein should not be construed as being limited to conventional or dictionary meanings, but may only construed as meanings and concepts consistent with the technical idea of the present disclosure on the basis of the principle that the inventors can properly define the meanings and concepts of the terms in order to best describe his invention.

Also, the use of the terms "a" and "an" and "the" and similar references in the context of describing the embodiments are to be construed to cover both the singular and the plural, unless otherwise indicated herein or clearly contradicted by context. Further, terms such as "includes," "comprises," and "have/has" should be construed as designating that there are such features, integers, steps, operations, elements, components, and/or combinations thereof, not to exclude the presence or possibility of adding of one or more of other features, integers, steps, operations, elements, components, and/or combinations thereof.

Exemplary embodiments will be described in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art.

For the same reason, some components may be exaggerated, omitted, or schematically illustrated in the accompanying drawings.

Referring to FIG. 1, a gas turbine 100 includes a compressor 110, a combustor 1000, and a turbine section 120. In a flow direction of gas (compressed air or combustion gas), the compressor 110 is disposed on the upstream side of the gas turbine 100, and the turbine section 120 is disposed on the downstream side of the gas turbine. In addition, the combustor 1000 is arranged between the compressor 110 and the turbine section 120.

The compressor 110 accommodates, inside a compressor casing, compressor vanes and a compressor rotor which includes a compressor disk and compressor blades, and the turbine section 120 accommodates, inside a turbine casing, turbine vanes and a turbine rotor which includes a turbine disk and turbine blades. These compressor vanes and the compressor rotor are arranged in a multi-stage along a flow direction of compressed air, and the turbine vanes and the turbine rotor are also arranged in a multi-stage along a flow direction of combustion gas.

At this time, it is preferably designed such that the compressor 110 has an internal space of which the volume decreases from the front-stage toward the rear-stage so that the intake air can be compressed, whereas the turbine 120 has an internal space of which the volume increases from the front-stage toward the rear-stage so that the combustion gas supplied from the combustor 1000 can expand.

On the other hand, between the compressor rotor located on the rear end side of the compressor 1000 and the turbine rotor located on the front end side of the turbine section 120, a torque tube is disposed as a torque transmission member to transmit the rotational torque generated by the turbine section 120 to the compressor 110. Although the torque tube may be composed of a plurality of torque tube disks arranged in three stages in total as illustrated in FIG. 1, this is only one of several embodiments of the present disclosure, so the torque tube may be composed of a plurality of torque tube disks arranged in four or more stages or two or fewer stages.

The compressor rotor includes a compressor disk and a compressor blade. A plurality of (e.g., 14) compressor disks are provided inside the compressor casing, and the respective compressor disks are fastened so as not to be spaced apart each other in the axial direction by a tie rod. More specifically, the respective compressor disks are aligned along the axial direction with the tie rod passing through the central portion thereof. In addition, adjacent compressor disks are arranged such that the opposing surfaces of the adjacent compressor disks are compressed by the tie rod so that the adjacent compressor disks cannot rotate relative to each other.

The plurality of compressor blades is radially coupled to an outer circumferential surface of the compressor disk in a multi-stage. Further, the plurality of compressor vanes is arranged in a multi-stage on an inner circumferential surface of the compressor casing such that each stage of compressor vanes is disposed between adjacent stages of compressor blades. Unlike the compressor disk, the compressor vanes maintain a fixed state so as not to rotate, and serve to guide the compressed air, which passed through an upstream-side stage of compressor blades, toward a downstream-side stage of compressor blades. Here, the compressor casing and the compressor vanes may be collectively defined as a compressor stator, in terms of that they do not rate, to distinguish them from the compressor rotor, which rotates.

The tie rod is arranged to penetrate the center of the plurality of compressor disks and turbine disks, which will be described later, such that one end thereof is fastened in the compressor disk located on the foremost end side of the compressor and the other end thereof is fastened by a fastening nut.

Since the tie rod may be formed in various structures depending on the gas turbine, the shape of the tie rod is not necessarily limited to the shape illustrated in FIG. 1. That is, as illustrated, for example, one tie rod may have a form in which the tie rod passes through the central portion of the compressor disks and the turbine disks, a form in which the plurality of tie rods are arranged in a serial manner, or a combination thereof.

Although not illustrated in FIG. 1, the compressor of the gas turbine may be provided with a deswirler that serves as a guide for increasing a pressure of fluid and adjusting a flow angle of the fluid entering a combustor inlet to a designed flow angle.

The combustor 1000 serves to mix an incoming compressed air with fuel supplied from a fuel injector (not shown) and combust the air-fuel mixture to produce high-temperature, high-pressure combustion gas with high energy, thereby raising the temperature of the combustion gas up to the heat-resistant limit of the combustor and turbine parts through an isothermal combustion process.

Figure 2:
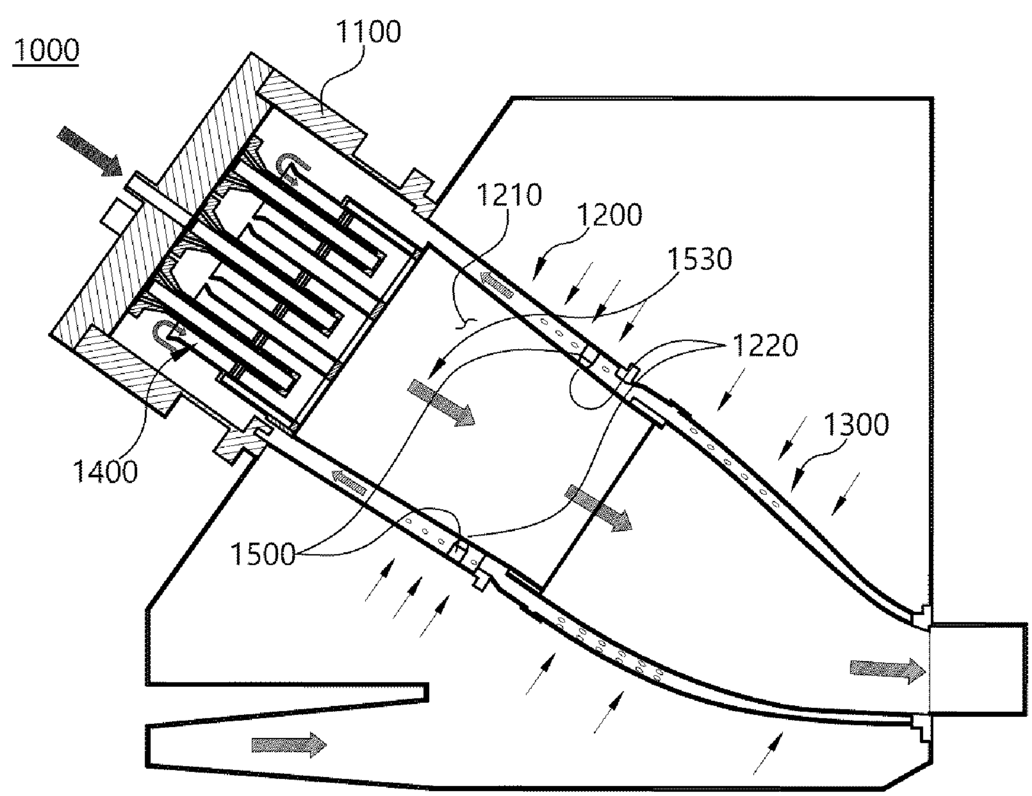
FIG. 2 is an enlarged cross-sectional view illustrating a combustor provided in the gas turbine illustrated in FIG. 1.

Referring to FIGS. 1 and 2, the combustor 1000 includes a nozzle casing 1100, a liner 1200, a transition piece 1300, a nozzle assembly 1400, and a jet nozzle 1500.

The nozzle assembly 1400 is disposed inside of the nozzle casing 1100 to inject fuel and compressed air. The liner 1200 is disposed at the downstream end of the nozzle casing 1100 and is connected to a turbine section 120 through the transition piece 1300, when the downstream direction is defined by a flow direction of the combustion gas. The liner 1200 internally has a combustion chamber 1210 in which a mixture of fuel supplied from a fuel injector (not shown) and compressed air supplied from the compressor 110 is combusted.

The transition piece 1300 is disposed at the downstream end of the liner 1200 and is connected to a turbine section 120 to supply combustion gas generated in the combustion chamber 1210 to the turbine section 120, when the downstream direction is defined by a flow direction of the combustion gas.

Specifically, the liner 1200 provides a combustion space in which a mixture of fuel and compressed air injected from the nozzle assembly 1400 are burned. The liner 1200 includes a combustion chamber 1210 that provides the combustion space in which the fuel mixed with air is burned, and an annular flow path that forms an annular space while surrounding the combustion chamber 1210. In addition, it is preferred that the nozzle assembly 1400 is coupled to the front side of the liner 1200 (i.e., the upstream end of the liner 1200) and an igniter (not shown) is coupled to the sidewall of the liner.

In the annular flow path of the liner 1200, compressed air is introduced through a plurality of holes provided in an outer wall of the liner 1200 and flows toward the nozzle assembly. In the annular flow path of the liner 1200, the compressed air that cooled the transition piece 1300 also flows toward the nozzle assembly. The transition piece 1300 is described later. As such, as the compressed air flows along the outer wall of the liner 1200 through the annular flow path of the liner 1200, the liner 1200 is protected from being thermally damaged by heat generated by the combustion of fuel in the combustion chamber.

The transition piece 1300 is connected to the rear side of the liner 1200 (i.e., the downstream end of the liner 1200) so that the combustion gas burned by an ignition plug in the combustion chamber can be transferred to the turbine side. Similar to the liner 1200, the transition piece 1300 has an annular flow path surrounding an inner space of the transition piece 1300, which is formed inside the transition piece 1300. As the compressed air flows along the annular flow path of the transition piece 1300, the outer wall of the transition piece is cooled and protected from damage due to high temperature of the combustion gas.

Meanwhile, the high-temperature and high-pressure combustion gas from the combustor 1000 is supplied to the turbine section 120 described above. The high-temperature and high-pressure combustion gas supplied to the turbine section 120 expands while passing through the inside of the turbine section 120, and accordingly, impulses and reaction forces are applied to the turbine blades, which will be described later, to generate rotational torque. The resultant rotational torque is transmitted to the compressor through the above-described torque tube, and an excess of the power required to drive the compressor is used to drive a generator or the like.

The turbine section 120 is basically similar to the structure of a compressor 110. That is, the turbine section 120 is also provided with a plurality of turbine rotors similar to the compressor rotor of the compressor 110. Thus, the turbine rotor includes a turbine disk and a plurality of turbine blades radially disposed around the turbine disk. The plurality of turbine vanes is also annually arranged, on the basis of the same stage, on the turbine casing between adjacent stages of turbine blades to guide a flow direction of the combustion gas, which passed through the turbine blades. Here, the turbine casing and the turbine vanes may be collectively defined as a turbine stator to distinguish them from the turbine rotor.

Figure 8:
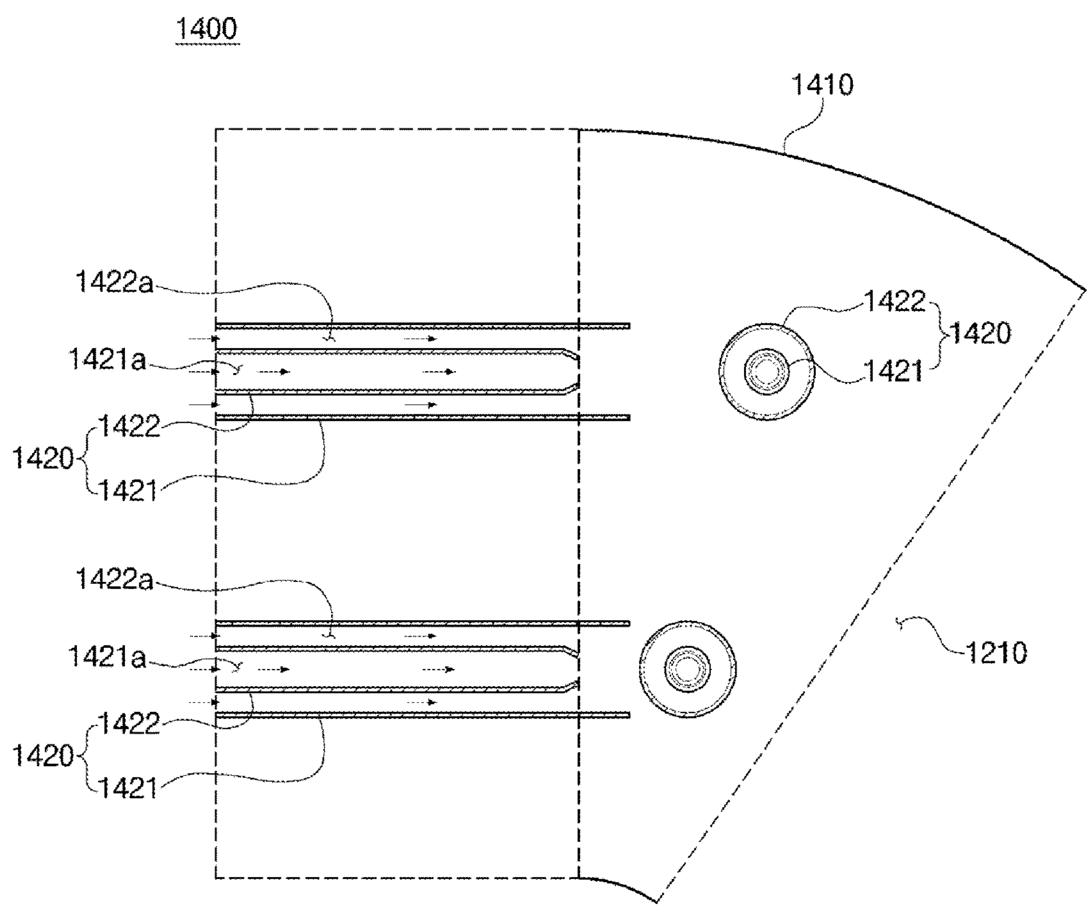
FIG. 8 is an enlarged view illustrating a portion of a nozzle assembly provided in the combustor illustrated in FIG. 2.

Referring to FIGS. 2 and 8, the nozzle assembly 1400 includes a nozzle body 1410 and an injection nozzle 1420.

Figure 5:
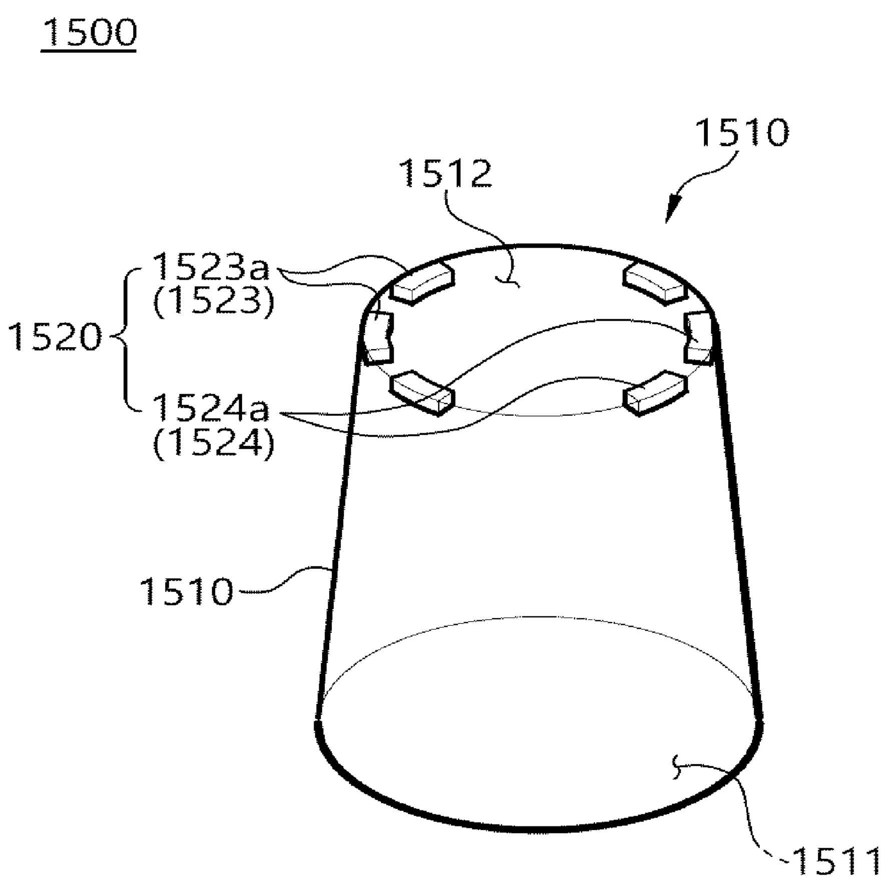
FIG. 5 is a perspective view illustrating a jet nozzle having a toothed baffle provided on the main body thereof according to another embodiment.

In FIG. 8, the drawing is depicted in a combined manner of two schematic views of the nozzle assembly 1400 for the benefit of understanding. That is, the left half drawing of the drawing in FIG. 5 schematically shows a cross-section of the injection nozzle 1420 in the nozzle assembly 1400 when viewed from a later side of the injection nozzle such that the left end of the left half drawing shows an upstream of the injection nozzle 1420 and the right end of the left half drawing is a downstream of the injection nozzle 1420. On the other hand, the right half drawing of the drawing in FIG. 5 schematically shows a portion of a cross-section of the nozzle body 1410 in the nozzle assembly 1400 when viewed in a direction from a downstream end or an outlet of the injection nozzle 1420 toward an upstream end or an inlet of the injection nozzle 1420. As an example, the drawing in FIG. 5 shows two injection nozzles 1420, one disposed nearer to the center of the cylindrical shape of the nozzle body 1410 than the other.

The nozzle body 1410 has a disc shape, only a portion of which is illustrated in FIG. 8. The nozzle body 1410 is disposed on the upstream side from the combustion chamber 1210 of the liner 1200 according to the flow direction of combustion gases. Accordingly, the nozzle body 1410 separates an internal space of the combustion chamber 1210 and the nozzle casing 1100 from each other.

The injection nozzle 1420 is installed in the nozzle body 1410 to inject fuel and compressed air into the combustion chamber 1210. The injection nozzle 1420 may be provided in plurality such that the multiple injection nozzles are inserted in the nozzle body 1410. The injection nozzle 1420 may include a first nozzle tube 1421 and a second nozzle tube 1422. The first nozzle tube 1421 may be a cylindrical member having a first flow path **1421*a* formed therein. The second nozzle tube 1422 may be a cylindrical-shaped member arranged to wrap around the first nozzle tube 1421 from a radially outer side of the first nozzle tube 1421 such that a second flow path 1422*a* is formed therebetween. The first nozzle tube 121 and the second nozzle tube 1422** may be disposed concentrically.

Referring now to FIGS. 2 to 7, the inner surface of the combustor 1000 is provided with a jet nozzle 1500. The jet nozzle 1500 serves to supply fluid into the interior of the liner 1200, in other words, into the combustion chamber 1210, in a direction intersecting with a progress direction of the combustion gas 1530 in the combustion chamber 1210 inside the liner 1200. The progress direction of the combustion gas 1530 is a direction from the injection nozzle 1420 toward the downstream end of the combustion chamber, in which the combustion gas generally flows toward the turbine section. On a peripheral side of the liner 1200, a communication port (1220) may be formed which is in communication with the jet nozzle 1500. The fluid supplied through the jet nozzle 1500 may be introduced into the combustion chamber through the communication port 1220. The peripheral side of the liner 1200 may mean an inner surface of the combustion chamber 1210, in other words, an inner surface of the liner 1200 facing the combustion chamber 1210. The communication port (1220) may be preferably formed near to the downstream end of the liner 1200, to which the transition piece 1300 is connected. According to an embodiment, the communication port 1220 may be formed at the downstream end of the peripheral side of the liner 1200. According to another embodiment, the communication port 1220 may be formed at a position substantially close to the downstream end of the peripheral side of the liner 1200. According to yet another embodiment, the communication port 1220 may be formed to be relatively nearer to the downstream end of the liner 1200 than to the upstream end of the liner 1200.

The jet nozzle 1500 includes a body section 1510 and a baffle section 1520, wherein the body section 1510 is provided with a fluid inlet 1511 on one end, through which fluid is introduced, and a fluid outlet 1512 on the other end, through which the fluid introduced through the fluid inlet 1511 is discharged. The direction in which the fluid flows from the fluid inlet 1511 toward the fluid outlet 1512 may be referred to as a longitudinal direction. The one end of the body section 1510 where the fluid inlet 1511 is provided may be referred to as a first end or a first longitudinal end and the other end of the body section 1510 where the fluid outlet 1512 is provided may be referred to as a second end or a second longitudinal end. The fluid introduced through the fluid inlet 1511 is provided with an enhanced counter-rotary shear layer vortex while flowing through the baffle section 1520 and is then discharged into the interior of the liner 1200 through the fluid outlet 1512.

The fluid outlet 1512 is connected to the communication port (1220) formed on the peripheral surface of the liner 1200, in other words, the inner surface of the combustion chamber 1210. The body section 1510 preferably has a hollow cylindrical shape whose diameter decreases from the first end to the second end.

According to an embodiment, the diameter of the fluid inlet 1511 formed on the first end of the body section 1510 is larger than the diameter of the fluid outlet 1512 formed on the second end of the body section 1510, thereby causing fluid to be discharged out of the fluid outlet 1512 with a pressure higher than the pressure of fluid introduced through the fluid inlet 1511.

The baffle section 1520 is installed on the inner surface of the second end of the body section 1510 where the fluid outlet 1512 is formed, and the baffle section 1520 serves to enhance the generation of a shear layer vortex in a counter-rotary direction in the fluid introduced through the fluid inlet 1511. The fluid with a counter-rotary shear layer vortex enhanced during flowing through the baffle section 1520 is supplied into the interior of the liner 1200 through the fluid outlet 1512. The baffle section 1520 may be formed to protrude from the inner surface of the second end of the body section 1510 toward the center of a circle defined by the second end of the body section 1510. The baffle section 1520 may include multiple parts, such that the multiple parts are spaced apart to each other in a circumferential direction of the circle and formed to protrude from the inner surface of the second end of the body section 1510 toward the center of a circle defined by the second end of the body section 1510. Two of the multiple parts of the baffle section 1520 may be formed at two opposing sides on the inner surface of the second end of the body section 1510 and protruding toward each other while both of them protruding toward the center of the circle at the same time.

Figure 3:
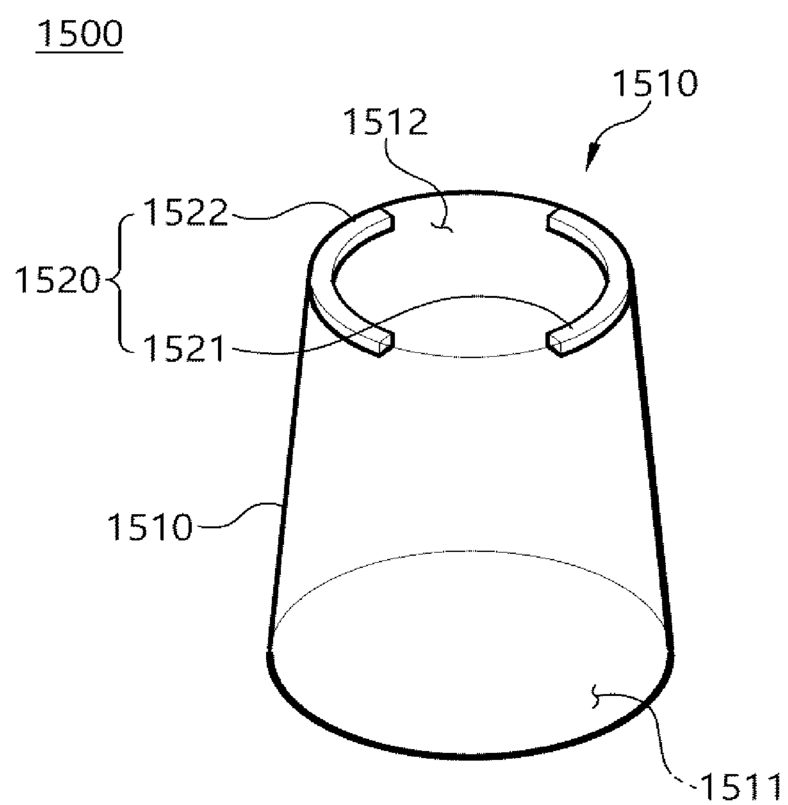
FIG. 3 is a perspective view illustrating a jet nozzle having a baffle integrally provided in a main body thereof according to an embodiment.
Figure 4:
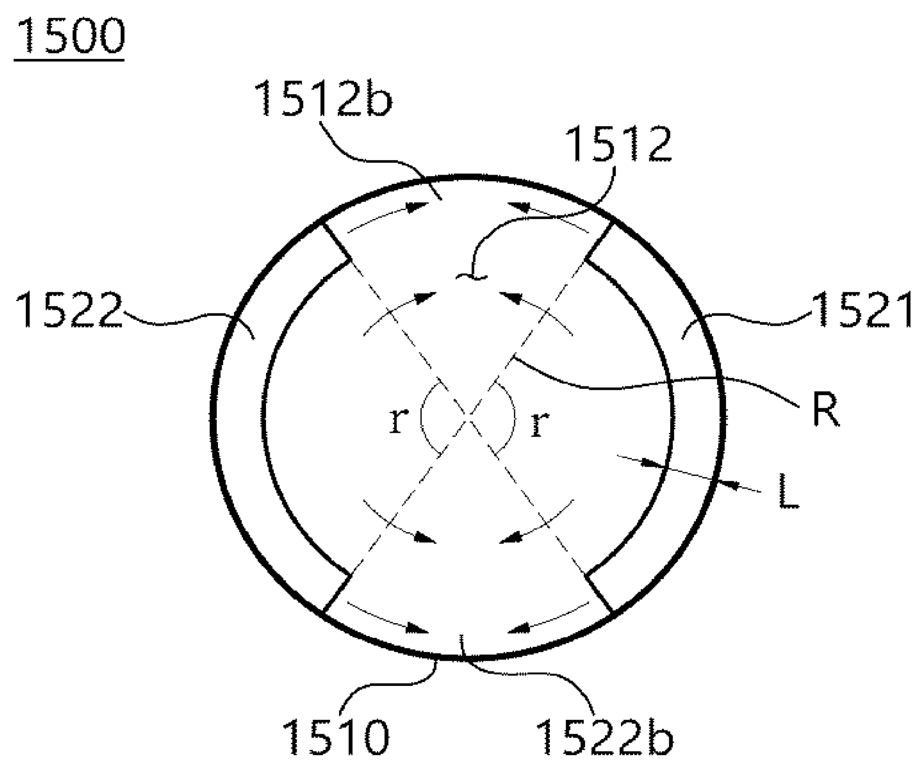
FIG. 4 is a schematic view illustrating a process for enhancing the generation of a counter-rotary shear layer vortex using the baffle.

Referring to FIGS. 3 and 4, according to an embodiment, the baffle section 1520 may include a first integral baffle part 1521 and a second integral baffle part 1522, wherein the first integral baffle part 1521 is installed at a first side on the inner surface of the second end of the body section 1510, and the second integral baffle part 1522 may be installed at a second side on the inner surface of the second end of the body section 1510 along the inner surface of the second end of the body section 1510 when the first side and the second side are opposing each other. The first integral baffle part 1521 and the second integral baffle part 1522 may be disposed to be opposing each other having the center of the circle defined by the second end of the body section 1510 in the middle between them. The first integral baffle part 1521 and the second integral baffle part 15522 may be spaced apart to each other by a gap 1521*b* and a gap 1522*b* along the circumferential direction. The gap 1521*b* and the gab 1522*b* may be in a same size in the circumferential direction.

A portion of the fluid flowing into the interior of the body section 1510 after being introduced through the fluid inlet 1511 may be diverted by the first integral baffle part 1521 so that a sub-flow of fluid is discharged out of the fluid outlet 1512 while generating a vortex in one direction. Another portion of the fluid flowing into the interior of the body section 1510 after being introduced through the fluid inlet 1511 may be diverted by the second integral baffle part 1522 so that another sub-flow of fluid is discharged into the interior of the liner 1200 through the fluid outlet 1512 while generating a vortex in other direction.

Preferably, the first integral baffle part 1521 and the second integral baffle part 1522 may be opposingly installed and each of them may have an arch angle r within 90° to 110° on two opposing peripheral sides of the second end of the body section 1510. The length L of the first integral baffle part 1521 and the second integral baffle part 1522 protruding from the inner peripheral surface toward the center portion of the body section 1510 is preferably less than or equal to ⅓ of a radius R of the fluid outlet 1512.

If the first integral baffle part 1521 and the second integral baffle part 1522 have an arch angle r of less than 900 or more than 110°, a counter-rotary vortex may not occur smoothly, and if the protruding length L is more than ⅓, fluid may not be discharged smoothly through the fluid outlet 1512.

Figure 6:
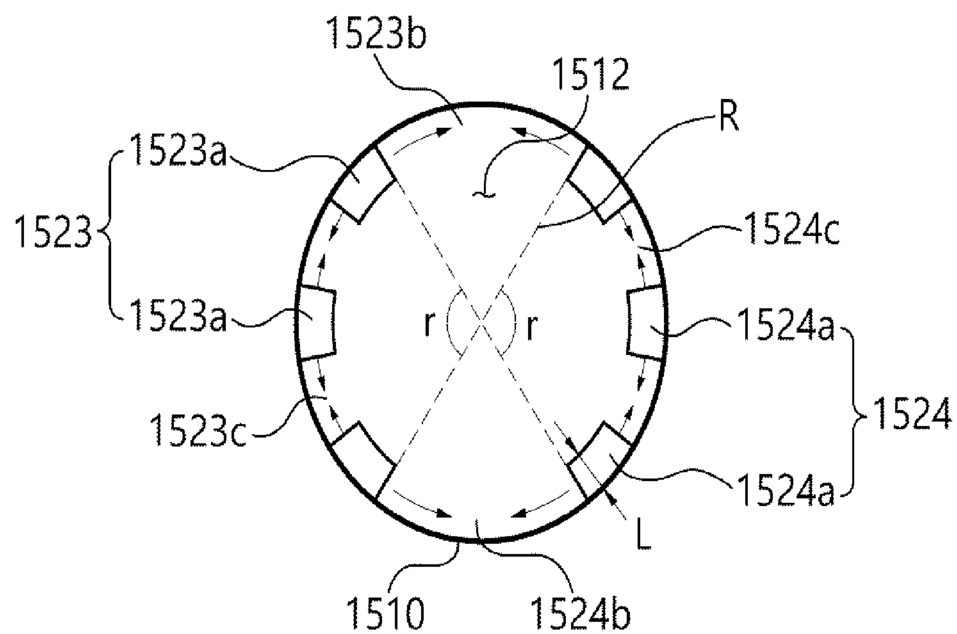
FIG. 6 is a schematic view illustrating a process for enhancing the generation of a counter-rotary shear layer vortex using the toothed baffle.
Figure 7:
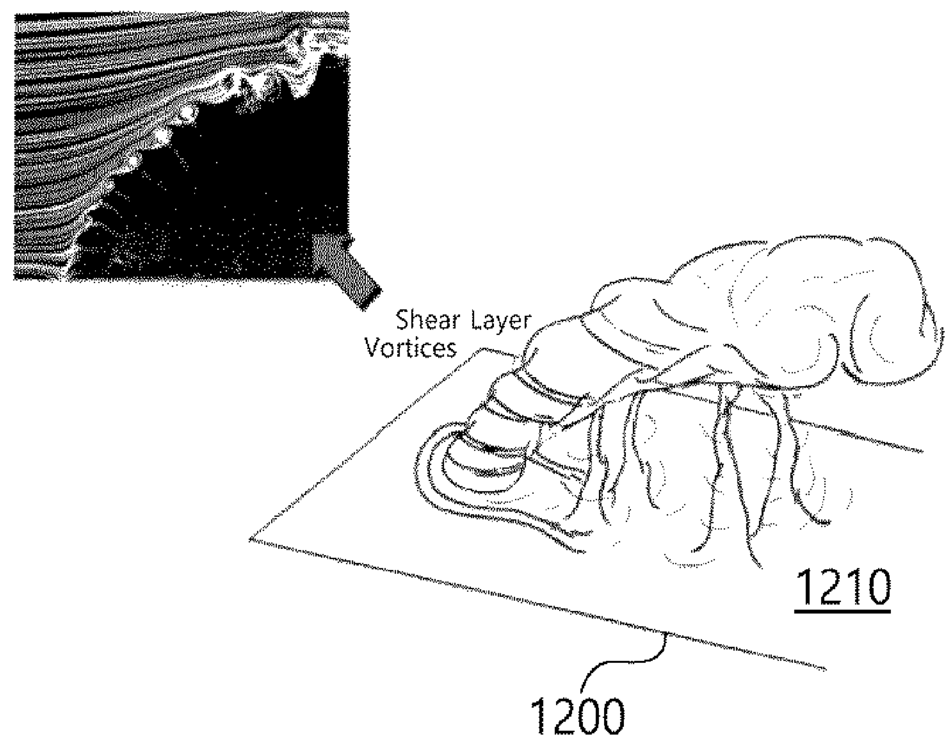
FIG. 7 is a view illustrating the state in which the fluid of which shear layer vortex generation is enhanced by the baffle is supplied into a combustion chamber illustrated in FIG. 2 and mixed with combustion gases.

Referring to FIGS. 5 and 6, according to an embodiment, the baffle section 1520 may include a first toothed baffle part 1523 and a second toothed baffle part 1524, wherein the first toothed baffle part 1523 is installed at a first side on the inner surface of the second end of the body section 1510, and the second toothed baffle part 1524 is installed at a second side on the inner surface of the second end of the body section 1510 along the inner surface of the second end of the body section 1510 when the first side and the second side are opposing each other. The first toothed baffle part 1523 and the second integral baffle part 1524 may be disposed to be opposing each other having the center of the circle defined by the second end of the body section 1510 in the middle between them. The first toothed baffle part 1523 and the second toothed baffle part 1524 may be spaced apart to each other by a gap 1523*b* and a gap 1524*b* along the circumferential direction. The gap 1523*b* and the gab 1524*b* may be in a same size in the circumferential direction.

The first toothed baffle part 1523 may include a plurality of first baffle teeth 1523*a* spaced apart from each other by a gap 1523*c*, and the second toothed baffle part 1524 also may include a plurality of second baffle teeth 1524*a* spaced apart from each other by a gap 1524*c*. The gap 1523*c* and the gap 1524*c* may be in a same size in the circumferential direction. The gap 1523*c* and the gap 1524*c* may be smaller than the gap 1523*b* and the gap 1524*b*.

Preferably, the first toothed baffle part 1523 and the second toothed baffle part 1524 may be opposingly installed and each of them may have an arch angle r within 90° to 110° on two opposing peripheral sides of the second end of the body section 1510. The length L of the first and second toothed baffle parts protruding from the inner peripheral surface toward the center portion of the body section 1510 is preferably less than or equal to ⅓ of a radius R of the fluid outlet 1512. The first toothed baffle part 1523 and the second toothed baffle part 1524 contribute to a reduction in the pressure loss.

The jet nozzle 1500 can supply fluid to the interior of the liner 1200 through the communication ports (1220) formed on the peripheral surface of the liner 1200 of the combustor 1000, in a direction that crosses or intersects or perpendicularly meet the progress direction of the combustion gases 1530 that is moved to the turbine 120 after being primarily combusted in the interior of the liner 1200. In other words, the air and fuel mixture discharged from the nozzle assembly into the combustion chamber may be primarily combusted to generate a combustion gas before the combustion gas meets the fluid provided by the jet nozzle 1500. When the primarily combusted combustion gas meets the fluid provided by the jet nozzle 1500, a second combustion can be carried out in the interior of the liner 1200, thereby increasing the combustion efficiency. In particular, the second combustion may be carried out near or at the surface of the liner 1200 facing the combustion chamber 1210 by the fluid introduced through the jet nozzle 1500 disposed on the inner surface of the combustion chamber 1210, in other words, on the inner surface of the liner 1200 facing the combustion chamber 1210. According to an embodiment, the second combustion may be carried out particularly with respect to the primarily combusted combustion gas that flows near and along the inner surface of the combustion chamber 1210.

Furthermore, according to the embodiments of the disclosure, the fluid can be supplied through the baffle section 1520 to the interior of the liner 1200 with enhanced generation of a counter-rotating shear layer vortex and the mixing rate of the combustion gases with the fuel may be further increased.

In the jet nozzle 1500, fluid is supplied into the interior of the liner 1200 of the combustor 1000 through a communication port (1220) formed on the peripheral surface of the liner in a direction intersecting with a progress direction of combustion gases that is moved to the turbine section 120 in the interior of the liner 1200 after being primarily combusted so that second combustion can be carried out in the interior of the liner 1200, thereby increasing combustion efficiency, and the fluid is supplied into the interior of the liner 1200 while enhancing the generation of a shear layer vortex in the counter-rotary direction by the baffle section 1520, thereby increasing the mixing rate of combustion gases and fuel.

Although the present disclosure has been described with reference to the embodiments illustrated in the drawings, the described embodiments are merely illustrative, so those skilled in the art will understand that various modifications and equivalents thereof can be made therefrom. Therefore, the true technical scope of the present disclosure should be determined by the technical spirit of the appended claims. Also, it is noted that any one feature of an embodiment of the present disclosure described in the specification may be applied to another embodiment of the present disclosure.

The invention claimed is:

1. A jet nozzle formed on an inner surface of a combustor to supply fluid into an interior of a liner of the combustor in a direction intersecting with a progress direction of combustion gases primarily combusted in a combustion chamber, the jet nozzle comprising:

a body section, extending in a longitudinal direction, provided with a fluid inlet on a first end, through which fluid is introduced, and a fluid outlet on a second end, through which the fluid introduced through the fluid inlet is discharged while generating a vortex; and a baffle section formed on and extending inward from an inner peripheral surface of the second end of the body section and configured to enhance the generation of a counter-rotary shear layer vortex in the fluid discharged out of the fluid outlet through the body section, wherein the baffle section is provided to opposingly protrude from two opposing peripheral portions of the second end of the body section toward a center portion of a circle defined by the second end of the body section, wherein the baffle section is formed on the inner peripheral surface of the second end of the body section such that the baffle section extends in an extension direction which is parallel to a circumferential direction of the circle from one circumferential end to an opposite circumferential end and has a substantially constant thickness, measured in the longitudinal direction, from the one circumferential end to the opposite circumferential end;

wherein the baffle section comprises a first integral baffle part provided at a first side on the second end of the body section, and a second integral baffle part provided at a second side on the second end of the body section, the first side and the second side being opposite each other, and wherein the first baffle part and the second baffle part are circumferentially spaced apart.

2. The jet nozzle according to claim 1, wherein the fluid outlet of the body section is connected to a communication port formed on a peripheral surface of the liner, the body section has a diameter which decreases from the first end to the second end.

3. The jet nozzle according to claim 2, wherein the first integral baffle part comprises a first toothed baffle part provided at the first side on the second end of the body section, and the second integral baffle part comprises a second toothed baffle part provided at the second side on the second end of the body section.

4. The jet nozzle according to claim 3, wherein the first toothed baffle part and the second toothed baffle part are opposingly provided to respectively have an arch angle within 90° to 110° on two opposing peripheral surfaces of the second end of the body section, and the first toothed baffle part and the second toothed baffle part respectively comprise a plurality of first baffle teeth spaced apart from each other and a plurality of second baffle teeth spaced apart from each other.

5. The jet nozzle according to claim 1, wherein the first integral baffle part and the second integral baffle part are opposingly provided to respectively have an arch angle within 90° to 110° on two opposing peripheral surfaces of the second end of the body section.

6. A combustor provided to mix compressed air supplied from a compressor of a gas turbine and fuel supplied from a fuel injector to form a compressed air-fuel mixture, to combust the mixture to produce combustion gases, and to supply the combustion gases to a turbine section of the gas turbine, the combustor comprises:

a nozzle casing;

a liner connected to a turbine section-side end of the nozzle casing and having a combustion chamber in which the compressed air-fuel mixture is combusted;

a transition piece connected to a turbine section-side end of the liner to supply the combustion gases generated in the combustion chamber to the turbine section;

a nozzle assembly disposed in the nozzle casing to inject fuel and compressed air into the combustion chamber; and a jet nozzle configured to supply fluid into an interior of the liner in a direction intersecting with a progress direction of the combustion gases primarily combusted in the combustion chamber, the jet nozzle comprising:

a body section, extending in a longitudinal direction, provided with a fluid inlet on a first end, through which fluid is introduced, and a fluid outlet on a second end, through which the fluid introduced through the fluid inlet is discharged while generating a vortex; and a baffle section formed on and extending inward from an inner peripheral surface of the second end of the body section and configured to enhance the generation of a counter-rotary shear layer vortex in the fluid discharged out of the fluid outlet through the body section, wherein the baffle section is provided to opposingly protrude from two opposing peripheral portions of the second end of the body section toward a center portion of a circle defined by the second end of the body section, wherein the baffle section is formed on the inner peripheral surface of the second end of the body section such that the baffle section extends in an extension direction which is parallel to a circumferential direction of the circle from one circumferential end to an opposite circumferential end and has a substantially constant thickness, measured in the longitudinal direction, from the one circumferential end to the opposite circumferential end;

wherein the baffle section comprises a first integral baffle part provided at a first side on the second end of the body section, and a second integral baffle part provided at a second side on the second end of the body section, the first side and the second side being opposite each other, and wherein the first baffle part and the second baffle part are circumferentially spaced apart.

7. The combustor according to claim 6, wherein the fluid outlet of the body section is connected to a communication port formed on a peripheral surface of the liner, the body section has a diameter which decreases from the first end to the second end.

8. The combustor according to claim 7, wherein the first integral baffle part comprises a first toothed baffle part provided at the first side on the second end of the body section, and the second integral baffle part comprises a second toothed baffle part provided at the second side on the second end of the body section.

9. The combustor according to claim 8, wherein the first toothed baffle part and the second toothed baffle part are opposingly provided to respectively have an arch angle within 90° to 110° on two opposing peripheral surfaces of the second end of the body section, and the first toothed baffle part and the second toothed baffle part respectively comprise a plurality of first baffle teeth spaced apart from each other and a plurality of second baffle teeth spaced apart from each other.

10. The combustor according to claim 6, wherein the first integral baffle part and the second integral baffle part are opposingly provided to respectively have an arch angle within 90° to 110° on two opposing peripheral surfaces of the second end of the body section.

11. A gas turbine comprising:

a compressor provided to compress air introduced from an outside;

a combustor provided to mix the compressed air supplied from the compressor with fuel supplied from a fuel injector and combust the air-fuel mixture; and a turbine section provided to generate power for generating electricity while combustion gases supplied from the combustor flow therethrough, the combustor comprising:

a nozzle casing;

a liner connected to a turbine section-side end of the nozzle casing and having a combustion chamber in which the compressed air-fuel mixture is combusted;

a transition piece connected to a turbine section-side end of the liner to supply the combustion gases generated in the combustion chamber to the turbine section;

a nozzle assembly disposed in the nozzle casing to inject fuel and compressed air into the combustion chamber; and a jet nozzle configured to supply fluid into an interior of the liner in a direction intersecting with a progress direction of the combustion gases primarily combusted in the combustion chamber, the jet nozzle comprising:

a body section, extending in a longitudinal direction, provided with a fluid inlet on a first end, through which fluid is introduced, and a fluid outlet on a second end, through which the fluid introduced through the fluid inlet is discharged while generating a vortex; and a baffle section formed on and extending inward from an inner peripheral surface of the second end of the body section and configured to enhance the generation of a counter-rotary shear layer vortex in the fluid discharged out of the fluid outlet through the body section, wherein the baffle section is provided to opposingly protrude from two opposing peripheral portions of the second end of the body section toward a center portion of a circle defined by the second end of the body section, wherein the baffle section is formed on the inner peripheral surface of the second end of the body section such that the baffle section extends in an extension direction which is parallel to a circumferential direction of the circle from one circumferential end to an opposite circumferential end and has a substantially constant thickness, measured in the longitudinal direction, from the one circumferential end to the opposite circumferential end;

wherein the baffle section comprises a first integral baffle part provided at a first side on the second end of the body section, and a second integral baffle part provided at a second side on the second end of the body section, the first side and the second side being opposite each other, and wherein the first baffle part and the second baffle part are circumferentially spaced apart.

12. The gas turbine according to claim 11, wherein the fluid outlet of the body section is connected to a communication port formed on a peripheral surface of the liner, the body section has a diameter which decreases from the first end to the second end.

13. The gas turbine according to claim 12, wherein the first integral baffle part comprises a first toothed baffle part provided at the first side on the second end of the body section, and the second integral baffle part comprises a second toothed baffle part provided at the second side on the second end of the body section.

14. The gas turbine according to claim 13, wherein the first toothed baffle part and the second toothed baffle part are opposingly provided to respectively have an arch angle within 90° to 110° on two opposing peripheral surfaces of the second end of the body section, and the first toothed baffle part and the second toothed baffle part respectively comprise a plurality of first baffle teeth spaced apart from each other and a plurality of second baffle teeth spaced apart from each other.

15. The gas turbine according to claim 3, wherein the first integral baffle part and the second integral baffle part are opposingly provided to respectively have an arch angle within 90° to 110° on two opposing peripheral surfaces of the second end of the body section.

* * * * *